United States Patent
Pinder et al.

(10) Patent No.: US 10,530,465 B2
(45) Date of Patent: Jan. 7, 2020

(54) APPARATUS, SYSTEM AND METHOD FOR GENERATING A VIRTUAL ASSISTANT ON A REPEATER

(71) Applicant: MOTOROLA SOLUTIONS, INC, Chicago, IL (US)

(72) Inventors: Ellis A. Pinder, Davie, FL (US); Matthew E. Simms, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/992,773

(22) Filed: May 30, 2018

(65) Prior Publication Data

US 2019/0372655 A1    Dec. 5, 2019

(51) Int. Cl.
*H04B 7/155* (2006.01)
*H04W 76/45* (2018.01)
*H04W 4/10* (2009.01)
*H04W 12/02* (2009.01)

(52) U.S. Cl.
CPC .......... *H04B 7/15528* (2013.01); *H04W 4/10* (2013.01); *H04W 12/02* (2013.01); *H04W 76/45* (2018.02)

(58) Field of Classification Search
CPC . H04B 7/15528; H04B 10/2918; H04W 4/10; H04W 12/02; H04W 76/45
See application file for complete search history.

(56) References Cited

U.S. PATENT DOCUMENTS

| | | | |
|---|---|---|---|
| 4,056,779 A | 11/1977 | Toler | |
| 5,295,178 A | 3/1994 | Nickel et al. | |
| 5,319,635 A * | 6/1994 | Reed | H04L 5/14 370/279 |
| 5,481,545 A | 1/1996 | Maedjaja et al. | |
| 5,887,050 A * | 3/1999 | Fenske | H04M 3/18 379/4 |
| 6,789,263 B1 * | 9/2004 | Shimada | H04N 7/17318 348/E7.071 |
| 7,706,851 B2 * | 4/2010 | Lam | H04B 1/64 455/212 |

(Continued)

OTHER PUBLICATIONS

The International Search Report and the Written Opinion corresponding serial No. PCT/US2019/031301 filed May 8, 2019, dated Aug. 6, 2019, all pages.

*Primary Examiner* — Dominic E Rego
(74) *Attorney, Agent, or Firm* — Barbara R. Doutre (57) ABSTRACT

A system, apparatus, and method are provided for integrating a virtual assistant (VA) subsystem (114) with a repeater (102) of a communication system (100). A conventional repeater (102) containing repeater receiver (108), a repeater controller (110), and a repeater transmitter (112) communicate with a plurality of radios (120, 130). The repeater controller (110) places the repeater (102) into a repeater mode or a virtual assistant mode based on a squelch code associated with an incoming radio signal. The system provides virtual assistant operation, prioritization of mission critical calls, interrupt, and privacy on a single conventional channel. The incorporation of the virtual assistant into a conventional repeater system has been advantageously achieved without the use of additional infrastructure or additional licensed channels.

22 Claims, 7 Drawing Sheets

(56) References Cited

U.S. PATENT DOCUMENTS

| | | | |
|---|---|---|---|
| 10,049,419 B1* | 8/2018 | Marron | G06Q 50/26 |
| 2003/0054813 A1* | 3/2003 | Riley | H04W 64/00 |
| | | | 455/424 |
| 2005/0070221 A1* | 3/2005 | Upton | H04B 7/2606 |
| | | | 455/11.1 |
| 2005/0186992 A1 | 8/2005 | Skret et al. | |
| 2005/0270067 A1* | 12/2005 | Masleid | H03K 19/01721 |
| | | | 326/121 |
| 2006/0009199 A1* | 1/2006 | Mittal | H04H 60/12 |
| | | | 455/414.1 |
| 2006/0223439 A1* | 10/2006 | Pinel | H04B 7/15507 |
| | | | 455/11.1 |
| 2007/0049239 A1* | 3/2007 | Joung | H04W 52/0216 |
| | | | 455/343.1 |
| 2007/0188968 A1* | 8/2007 | Hamada | A63F 13/06 |
| | | | 361/160 |
| 2010/0260092 A1* | 10/2010 | Nagaraja | H04B 7/0404 |
| | | | 370/315 |
| 2011/0167176 A1* | 7/2011 | Yew | G06F 13/385 |
| | | | 710/6 |
| 2012/0195226 A1* | 8/2012 | Liu | H04L 1/0026 |
| | | | 370/252 |
| 2012/0265528 A1* | 10/2012 | Gruber | G10L 15/18 |
| | | | 704/235 |
| 2013/0039201 A1* | 2/2013 | Kwon | H04L 45/22 |
| | | | 370/252 |
| 2013/0078907 A1* | 3/2013 | Gore | H04B 7/15535 |
| | | | 455/11.1 |
| 2014/0359114 A1* | 12/2014 | Takamure | G06F 9/45558 |
| | | | 709/224 |
| 2015/0213355 A1* | 7/2015 | Sharma | G06F 17/289 |
| | | | 706/11 |
| 2015/0220244 A1* | 8/2015 | Vats | G06F 3/04815 |
| | | | 715/850 |
| 2016/0093304 A1* | 3/2016 | Kim | G10L 15/26 |
| | | | 704/235 |
| 2016/0099784 A1* | 4/2016 | Bratfisch | H04B 17/23 |
| | | | 375/228 |
| 2016/0110422 A1* | 4/2016 | Roytman | G06N 5/00 |
| | | | 706/12 |
| 2017/0116978 A1 | 4/2017 | Matsubara | |
| 2017/0142559 A1* | 5/2017 | Feng | H04W 4/90 |
| 2017/0164271 A1* | 6/2017 | Natarahjan | H04W 48/16 |
| 2017/0242860 A1* | 8/2017 | Souche | G06N 5/043 |
| 2017/0286507 A1* | 10/2017 | Hosogi | G06F 16/245 |
| 2017/0289350 A1* | 10/2017 | Philbin | G08B 25/016 |
| 2018/0098030 A1* | 4/2018 | Morabia | H04N 7/152 |
| 2018/0144590 A1 | 5/2018 | Mixter et al. | |
| 2018/0248817 A1* | 8/2018 | Licht | H04L 51/04 |
| 2019/0026936 A1* | 1/2019 | Gorur Sheshagiri | G06T 7/70 |
| 2019/0042601 A1* | 2/2019 | Ashe | H04L 67/10 |
| 2019/0065839 A1* | 2/2019 | Kavikkal | G06K 9/00402 |

* cited by examiner

APPARATUS, SYSTEM AND METHOD FOR GENERATING A VIRTUAL ASSISTANT ON A REPEATER

FIELD OF THE INVENTION

The present invention relates generally to communication systems, and more particularly to a repeater operating within a conventional communication system.

BACKGROUND

Radio communication systems are critical to public safety environments such as law enforcement, fire rescue, and mission-critical environments. Conventional repeaters provide a low-cost infrastructure used in radio communication systems as part of a communication path between radios. Conventional radios operate on fixed channels where each user group is permanently assigned a fixed frequency or a set of frequencies. The conventional communication system, unlike a trunked system, does not rely on a control channel or core switching. The conventional radio provides user-selectable radio channel selection for instant channel access. While the cost and simplicity of a conventional system is highly desirable, the conventional repeater poses challenges to the integration of additional communication resources.

Management of the repeater channel can be challenging due to the limited communication paths in which a conventional transmission occurs. Today's public safety personnel need to be able to manage both mission critical communications as well as other types of communications in the most seamless manner possible. It is highly desirable to address the management challenges associated with the conventional repeater and to do so at minimal cost without adding additional hardware.

Accordingly, there is a need for a conventional radio system that can provide additional communication resources.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a system, apparatus, and method for integrating a virtual assistant into a radio communication system. The radio communication system is a conventional radio communication system having at least one repeater which interoperates with a plurality of radios. The repeater provides a repeater controller, a repeater transmitter, and a repeater receiver for operation in a conventional mode. In accordance with the embodiments, the repeater further operates with a virtual assistant subsystem. The virtual assistant subsystem provides a software agent to the repeater enabling responses to virtual assistant (VA) queries initiated from radios interoperating with the repeater. The combination of conventional repeater operation and virtual assistant operation advantageously expands the capabilities of radios operating within the communication system. In accordance with the embodiments, the repeater controller is operatively coupled to the virtual assistant (VA) subsystem thereby enabling the repeater to provide at least two modes of operation comprising a conventional repeater mode (also referred to as normal mode) and a virtual assistant (VA) mode.

In some embodiments, the virtual assistant (VA) mode of operation of the repeater may be enhanced through a feature that enables interruption of VA queries and responses. In some embodiments, the VA mode of operation of the repeater may be further enhanced with a privacy feature that prevents queries and responses from being heard by other, non-initiating radios. The repeater of the various embodiments is able to seamlessly switch between conventional mode operation and virtual assistant mode operation through the use of predetermined squelch codes. The conventional mode of operation will be referred to herein as normal mode operation. Normal mode operation takes priority over the VA mode of operation to ensure that mission critical communications, which take place in normal mode, are given priority.

Figure 1:
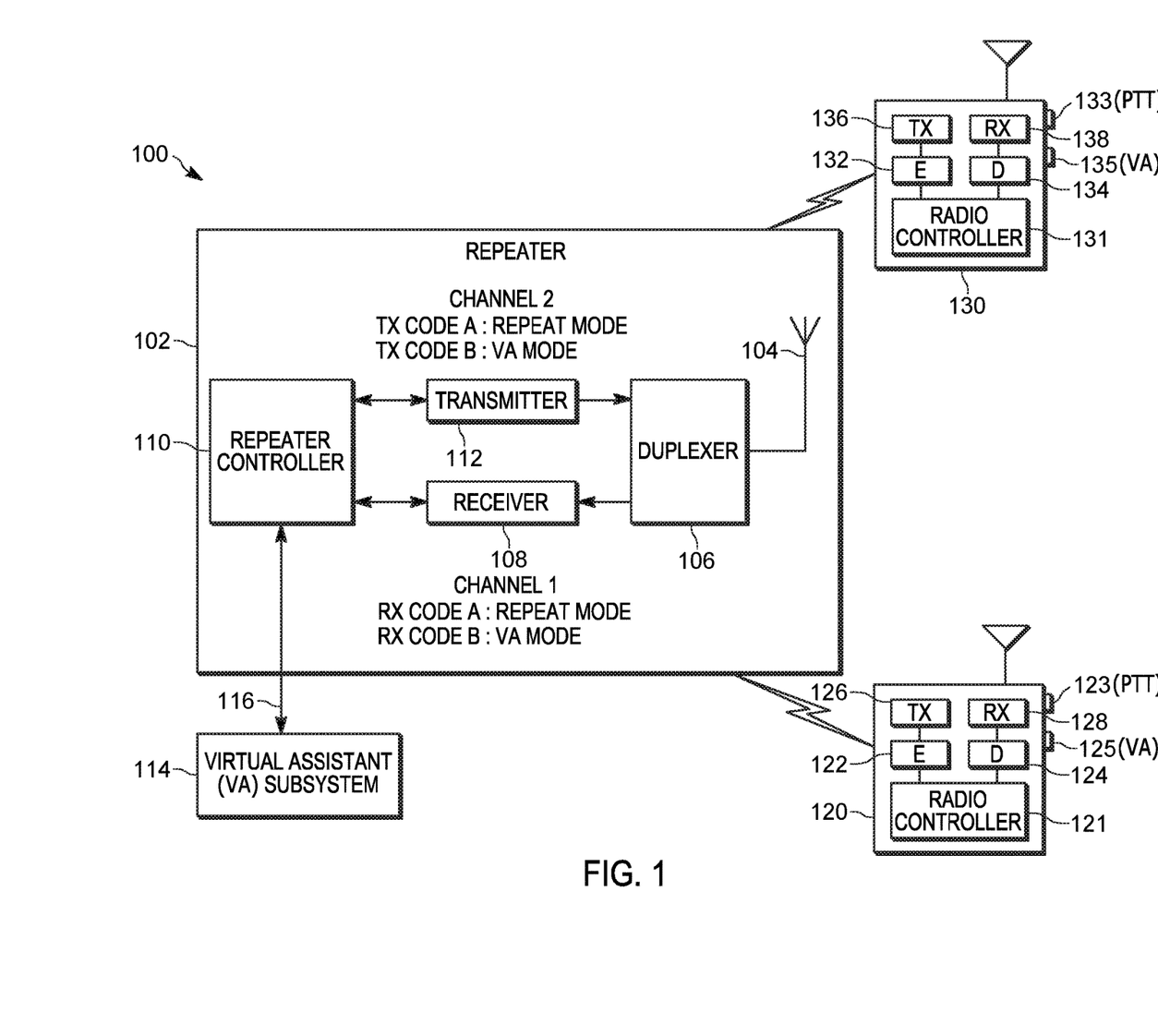
FIG. 1 is a block diagram of communication system in accordance with the embodiments.

FIG. 1 is a block diagram of communication system 100 formed and operating in accordance with the embodiments. Communication system 100 comprises a repeater 102, which in accordance with the embodiments, provides both a conventional repeater mode of operation and a virtual assistant mode of operation. In accordance with the embodiments, the repeater 102 comprises an antenna 104, a duplexer 106, a repeater receiver 108, a repeater controller 110, a repeater transmitter 112, and a virtual assistant (VA) subsystem 114. The repeater controller 110 is communicatively coupled to the repeater receiver 108 and the repeater transmitter 112 for controlling transmit and receive operations. In accordance with the embodiments, the virtual assistant (VA) subsystem 114 is communicatively coupled to the repeater controller 110 over a wired or wireless link 116. The VA subsystem 114 may be located inside the repeater 102 or located externally to the repeater.

The VA subsystem 114 is formed of an artificial intelligence server providing language processing and response capability to operate as a virtual assistant. Virtual assistants, such as Siri provided by Apple, Inc.® and Google Now provided by Google, Inc.®, are software applications that understand natural language and complete electronic tasks in response to user inputs.

In accordance with the embodiments, the repeater controller 110 selectively controls the normal repeater mode of operation and the virtual assistant (VA) mode of operation. In accordance with the embodiments, the VA subsystem 114 generates a response to an incoming query from an initiating radio, such as radio 120, and the repeater transmitter 112 transmits the response back to the initiating radio 120. The various embodiments describe the system's ability to control the retransmission of the VA query and VA response to other non-initiating radios, such as radio 130, and to further return to normal mode of operation in response to interruptions indicative of normal mode communications.

The radios 120, 130 may be land mobile radios (LMR), such as Association of Public-Safety Communications Officials-International Project-25 (APCO 25) radios, digital mobile radio (DMR) devices, or any conventional protocol radio which has a repeater as part of its overall system design. For the purposes of this application, the radios 120, 130 operate with the repeater 102 as part of a non-trunked communication system. Radio 120 inter-operates with repeater 102 and radio 130 by transmitting a communication signal on a first channel to the repeater, the repeater receiving on the first channel, and then repeater 102 transmits/repeats the communication signal over a second channel to the radio 130, wherein radio 130 receives the communication signal over the second channel.

In accordance with the embodiments, the repeater controller 110 utilizes predetermined squelch codes to manage both normal repeater mode operation VA repeater mode operation. The "squelch code" is a privacy type code meant to isolate communication traffic sharing the same channel. For the purposes of this application, the squelch code on analog channels is a subaudible tone meaning the tone is below 300 Hz but within the audio passband. The squelch code may be a private line (PL) or digital private line (DPL) code modulated on the carrier below 300 Hz (sub-audible). For digital channels, the squelch code is a code embedded periodically within the digital data stream, such as within each frame, to isolate communication traffic sharing the same channel. In accordance with the various embodiments, a plurality of squelch codes may be utilized including at least a first squelch code and a second squelch code. For ease of representation and description, and to further facilitate distinguishing the squelch codes from channel numbers, the embodiments are described in terms of letter designations. For example, a first squelch code can be represented by "code A" and a second squelch code can be represented by "code B". The use of letter designations is not intended to be limiting or imply any order, and the claims recite first and second squelch codes, again without implying any specific order.

In operation, the repeater receiver 108 receives either the first squelch code or the second squelch code, for example squelch code A or squelch code B, from an initiating radio, such as radio 120. The squelch code is routed to the repeater controller 110, where the controller determines whether the squelch code is indicative of a first mode for normal repeater communication or a second mode for virtual assistant repeater communication. The repeater controller 110 may switch from one mode of operation to another based on the predetermined squelch codes assigned for the different modes of operation.

Radio 120 comprises a radio controller 121 interoperating with a squelch encoder 122 and a radio transmitter 126. Radio controller 121 further interoperates with a squelch decoder 124 and radio receiver 128 of radio 120. Radio 130 similarly comprises a radio controller 131 interoperating with a squelch encoder 132 and a radio transmitter 136. Radio controller 131 further interoperates with a squelch decoder 134 and a radio receiver 138 of radio 130. The squelch encoders 122, 132 of each radio 120, 130 generate squelch code for transmission mode. The squelch decoders 124, 134 of each radio 120, 130 detect at least first and second squelch codes received from the repeater transmitter 112. The sub-audible squelch encoders can generate a first squelch code to select the first mode of repeater operation for normal operation. The sub-audible squelch encoder also generates the second squelch code to select the second mode of repeater operation for virtual assistant operation. The repeater controller 110 uses different received squelch codes to take various actions, such as repeat the communication, route the communication to the VA subsystem 114, or ignore the communication.

From a user standpoint, for normal operation the user simply presses the PTT button 123 of radio 120 to begin normal communication. Similarly the user of radio 130 uses PTT 133 for normal communication. For the VA communication mode, the user presses the VA button 125 on the first radio 120 followed by a press to the push-to-talk (PTT) transmit button 123 to enable squelch code B indicating a VA query. The VA query signal is transmitted to the repeater 102 and received by the repeater receiver 108 on channel 1, code B, assigned for VA requests. It can be appreciated a separate PTT buttons could be used, for example a PTT normal button and a PTT VA button.

The repeater 102 has a limited number of channels with which to provide repeater operation to the plurality of radios 120, 130. The repeater 102 receives on a first frequency channel and transmits on a second frequency channel. The use of squelch codes beneficially controls selectively enabling normal repeater mode and virtual assistant repeater mode and the squelch codes further control the privacy and interrupt settings so that normal communication audio is given priority over VA communications.

In accordance with the embodiments, the repeater controller 110 manages routing of regular communication traffic between radios 120, 130 and further manages the routing of virtual assistant (VA) communication between an initiating radio, such as radio 120, and the virtual assistant subsystem 114. A variety of embodiments are provided which enable repeating queries and responses to non-initiating radios, interrupting the virtual assistant, resuming virtual assistant operation after interruption, queuing of virtual assistant responses, and privacy of queries and responses.

Table 1 shows a list of operation modes and a description of operation for each mode type of the communication system 100 in accordance with the embodiments.

TABLE 1

| Mode Type | Operation |
|---|---|
| Repeater Mode | Qualified channel activity with the first squelch code on the repeater's receive frequency is repeated on the repeater's transmit frequency. This is the typical operation of a conventional repeater and represents human-to-human voice interaction. |
| VA Mode | Qualified channel activity with the second squelch code causes the repeater's receive audio to be routed to the VA subsystem 114 (and optionally repeated by the repeater's transmitter 112 using the second squelch code.) The VA response is routed to the repeater transmitter 112 where it is transmitted with the second squelch code. Transmitting with the second squelch code allows receiving radios to discern between the VA response (second squelch code) and repeated audio (first squelch code). |

Table 1 is not intended to be limiting as other operating modes for the communication system 100 may also be present. For example, the repeater 102 may also include additional operating modes, such as telephone interconnect.

As is common in the prior art, a conventional channel in a radio allows the programming of a transmit frequency and a receive frequency, which may or may not be the same. For talkaround or direct operation, these frequencies are the same. For repeater operation, these frequencies are different and align with the repeater's transmit and receive frequencies. Additionally, a squelch code may be associated with the transmit frequency of a channel and a squelch code may be associated with the receive frequency of the channel. The most commonly used configuration is to use the same squelch code for each channel. For example, a common repeater usage scenario would be:
  a. Radio transmits on frequency 1, code A
  b. Radio receives on frequency 2, code A
  c. Repeater receives on frequency 1, code A
  d. Repeater transmits on frequency 2, code A.
Note that the radio transmits on the repeater's receive frequency and the repeater transmits on the radio's receive frequency. Code A is used for all communication in the above example.

In accordance with the embodiments, the repeater receiver 108 of repeater 102 is capable of monitoring for at least two squelch codes and the repeater transmitter 112 is capable of generating at least one of two squelch codes. The repeater controller 110 contains logic which acts upon the detected squelch code and takes appropriate action including controlling repeater operation and audio routing. The communication system 100 of the embodiments operates using at least two repeater modes: a normal repeater mode such as traditionally used for voice communication over a repeater, and the VA repeater mode. The repeater controller 110 and the radios 120, 130 select and monitor the plurality of squelch codes associated with the channel to indicate the type of communication (i.e. standard voice communication or VA-related communication).

In accordance with the embodiments, the repeater 102 and radios 120, 130 are programmed for a first squelch code (e.g. "code A") associated with voice communication and a second squelch code (e.g. "code B") associated with VA communication. This radio configuration is performed for each radio channel. Additional configuration parameters are also possible. For example, a configuration that enables a radio to "Monitor All VA Responses" may be enabled. The "Monitor All VA Responses" parameter may be enabled radio-wide or be channel-scoped.

In accordance with the embodiments, a repeater configuration parameter referred to a "Repeat VA Query" causes the repeater controller 110 to select among different routing choices for a received VA request. If this feature is disabled, then the incoming VA request is routed only to the VA subsystem 114. If this feature is enabled, then the incoming VA request is repeated by the repeater transmitter 112 in addition to being routed to the VA subsystem 114. Enabling this feature allows other radio users, such as radio 130, to hear the VA request from the initiating radio 120.

Figure 2:
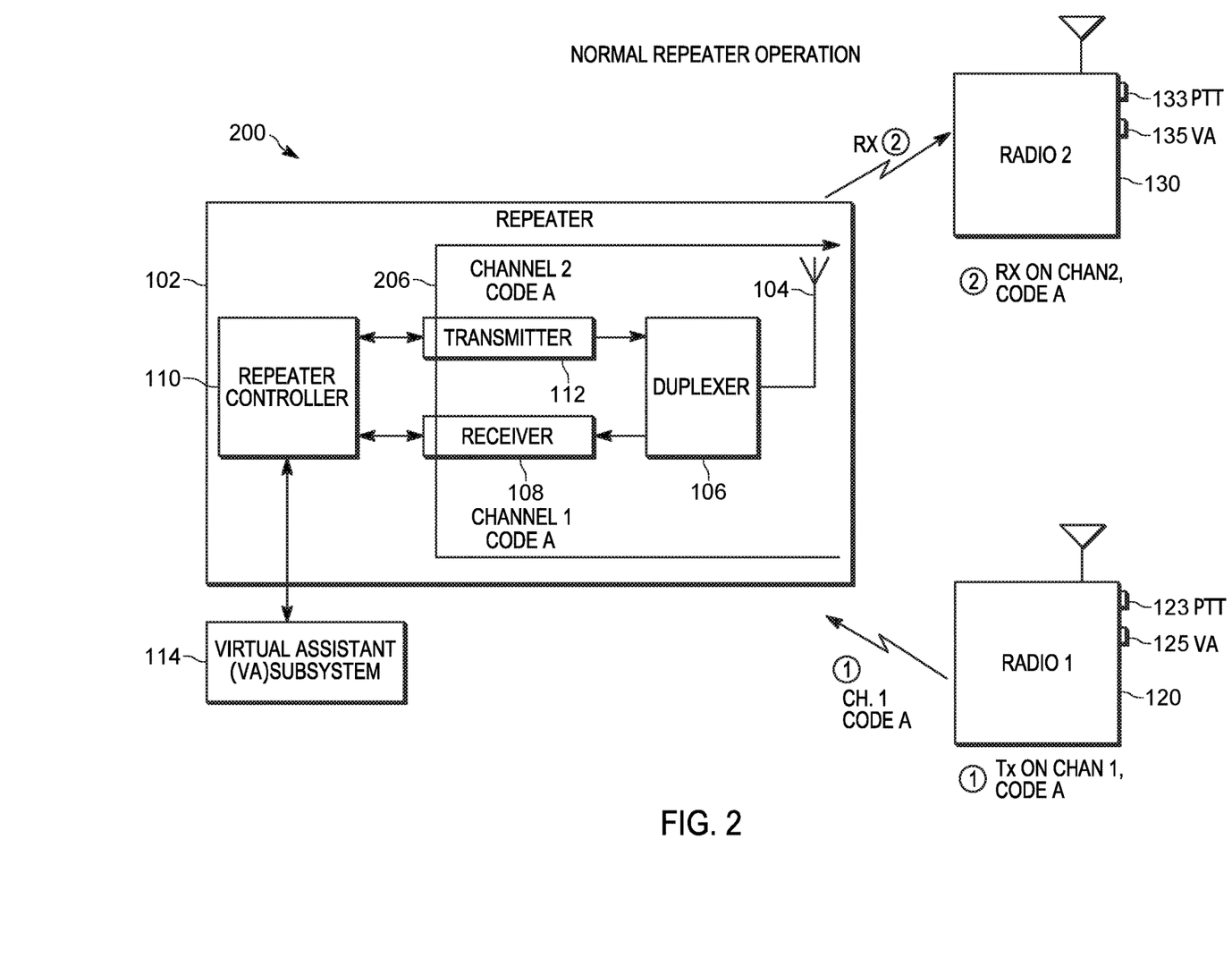
FIG. 2 is a signal routing diagram for a conventional repeater mode of operation for the communication system formed in accordance with the embodiments.

FIG. 2 is a signal routing diagram 200 for normal repeater mode operation on the communication system 100 of FIG. 1 formed in accordance with the embodiments. In the normal operating mode, the first radio 120 communicates with the second radio 130 via the repeater 102. In normal repeater mode operation, the first radio 120 transmits, via a push-to-talk button 123, on a first channel (CH1) with a first squelch code (e.g. code A) indicative of normal communication. The communication signal 206 is received, via antenna 104 and duplexer 106, at repeater receiver 108 on channel 1, code A. The receiver 108 converts the communication from RF down to baseband and then routes the communication signal 206 to repeater controller 110. The repeater controller 110 manages the routing of the communication signal 206 to the repeater transmitter 112, for transmission on another channel with the same squelch code, in this example channel 2 (CH2), code A. The repeater transmitter 112 thus transmits (repeats) the communication signal 206 on channel 2 (CH2), code A. Second radio 130 can receive communication signals using either squelch code. In this case, second radio 130 receives the communication signal 206 on channel 2, code A.

Any one of the plurality of radios can transmit in this manner and all other radios in range of the repeater 102 should receive the communication signal 206 from the transmitting radio. When squelch code A is used, then the repeater 102 will repeat the communication signal 206 to other radios on channel 2. Radios such as radio 130, requiring code A will unmute, while radios expecting a different code other than code A will not unmute. Repeater 102 may further be configured to repeat communication and transmit on a different code, for example code C. In such a case, only radios on channel 2 code C would unmute (not shown). The squelch codes may be further refined with mute/unmute settings that determine when the receiver 138 of a non-initiating radio 130 shall mute or unmute. Other squelch codes (like code C above) may be used in this way to control the distribution of which non-initiating radios hear all queries/responses. For example, if the repeater repeats all code B, all non-initiating users could be configured to hear code B. If the repeater has further configuration to qualify certain queries that it receives with a specific user (like a supervisor), then the repeater may repeat with Code C, such that only supervisors are privy to supervisor queries etc. In this way, a plurality of codes can be used to support a hierarchy of VA listening by non-initiating radios 130. The initiator radio 120, regardless of hierarchy can always hear the response to its own query.

It should be noted that communication signal 206 changes form as it moves through system 100. It should be further understood that the elements within repeater 102 are interoperated via control paths (not shown). For example, communication signal 206 is a radio frequency (RF) signal from radio 120 to repeater receiver 108, where it is demodulated to an analog or digital baseband audio signal. Similarly, from repeater transmitter 112 to radio 130, the communication signal 206 is converted to an RF signal. Communication signal 206 thus depicts the routing of information through system 100 for ease of understanding, and is not intended to exclusively represent one physical kind of signal. For the purposes of this application, the signal processing of communication signals, whether normal mode communication signal or VA communication signal, through the repeater will not be further described.

Accordingly, in the embodiment of FIG. 2, in the first (normal communications) operating mode the repeater receiver 108 utilizes a first channel and first squelch code (e.g. code A) to activate the repeater controller 110, and the repeater controller 110 enables the repeater transmitter 112 to retransmit the communication on the second channel using the first squelch code. During regular repeater operation as shown in FIG. 2, the repeater transmitter 112 is active only when qualified channel activity is detected by the repeater receiver 108. Qualified channel activity is conventional channel activity that satisfies rules pertaining to unmuting, e.g. a carrier detect and a matching squelch code.

Figure 3:
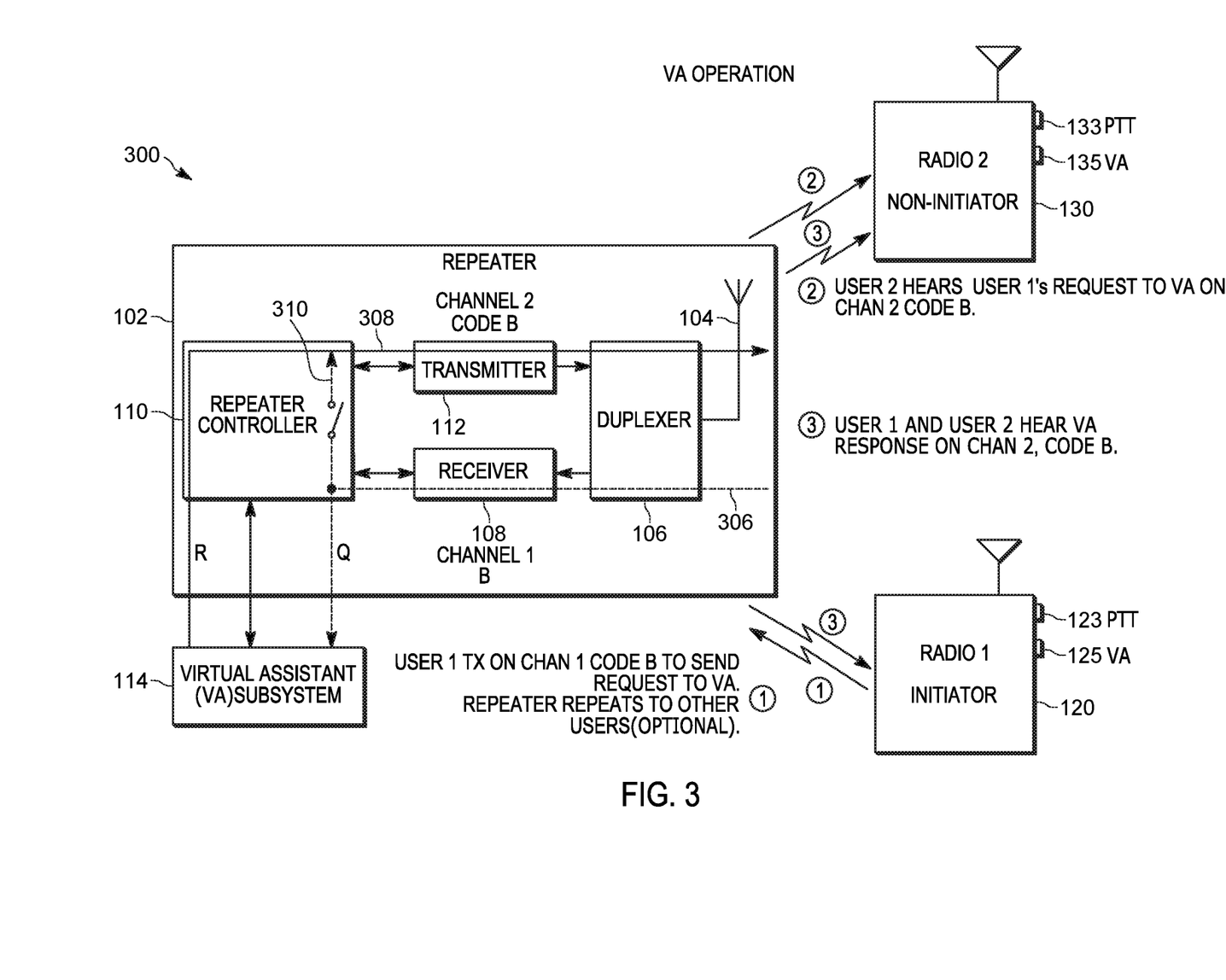
FIG. 3 is a signal routing diagram for a virtual assistant mode of operation for the communication system formed in accordance with the embodiments.

FIG. 3 is a signal routing diagram 300 for virtual assistant (VA) mode operation on the communication system 100 in accordance with some embodiments. For the VA mode of operation, first radio 120 initiates a VA request by manual activation of the VA button 125 to enable a squelch code change in radio 120, from the first code (code A), to the second code (code B). The repeater receiver 108 utilizes the second, code B squelch code to notify the repeater controller 110, and route the query to the VA subsystem 114. Again, the use of letter designation for the squelch codes is not intended to be limiting, as "code A" can also be referred to as a first squelch code and code B can also be referred to as a second squelch code.

The VP query is received at repeater 102 as communication signal 306 on channel 1, code B. In this embodiment, the virtual assistant (VA) subsystem 114 may repeat the request to other radios on channel 2 using code B. If the repeater configuration setting "repeat VP query on code B" is enabled, then the repeater controller 110 will route the received VA query audio to repeater transmitter 112 via switchable audio path 310. This allows the received VA request to be transmitted to other non-initiating radios, such as radio 130, using channel 2, code B.

A VA response to the VA query is generated by VA subsystem 114. Initiating radio 120 will unmute to the received VA response that is transmitted from the repeater 102 on channel 2, code B. Other non-initiating radios, such as radio 130, may or may not unmute to the received VA response depending on radio configuration. In other words, the non-initiating radio 130 can be configured to hear the VA query originating from radio 120, but may be further configured to not hear the VA response. For example, radio 130 can hear the query if switch 310 is engaged, as this is a repeater configuration setting not a radio one. Radio 130 can also hear the VA response if radio 130 has a radio configuration setting to listen to all Code B transmit traffic from the repeater. For example, a radio configuration setting at radio 130 can be set to "Monitor all VA Responses" which will unmute to all VA responses. If this feature is disabled, then only the initiating radio 120 will hear the VA response.

The repeater receiver 108 repeats normal traffic received with the normal traffic code (e.g. code A) to other radios in the system while traffic received with code B is forwarded to the VA subsystem 114 for processing and generation of a VA response signal 308. For cases where the VA request was repeated to all radios (based on a repeater configuration setting), those non-initiating, receiving radios with the radio feature "Monitor All VA Responses" enabled will unmute to hear the VA request on code B, while those radios with this feature disabled will not unmute. In other words, both configuration settings must be met before non-initiating radios may hear queries and the subsequent responses.

In accordance with the embodiments, the initiating radio 120 may enforce different rules for normal mode receive operation and VA mode receive operation. In accordance with the embodiments, human-based traffic is considered to be higher priority than VA traffic. Radio operation may thus differ depending on the received code set at the initiating radio 120. For example, the use of code B may enable a predetermined rule or setting that prevents transmit inhibit on busy (no TX inhibit on busy). The no TX inhibit on busy setting allows the radio to transmit in normal mode, via a press of PTT button 123, even if the radio is busy receiving a VA response. This configuration advantageously allows regular radio traffic to take priority over the VA traffic. The predetermined VA setting may be configured at the time of radio programming but may alternately be configured by the user on the radio.

From the repeater side, when the repeater 102 is issuing a VA response with Code B, the inbound channel is free to receive either normal or additional VA queries. If the inbound channel is another query (Code B), it will queue the query for when the current query is completed. If however new inbound traffic is voice traffic (Code A), the repeater will cease issuing the VA response (with Code B) and immediately transition to repeating the voice traffic with Code A.

Hence, the signal routing for virtual assistant (VA) mode operation of repeater 102 may thus provide for the following sequence:

1) first radio 120 (user 1) transmits on channel 1, code B to send a VA request to the VA subsystem 114;
2) other non-initiating radios 130 within the system may receive/hear the request on channel 2, code B (depending on predetermined radio mute/unmute settings to VA queries);
3) the initiator radio 120 and non-initiating radio 130 receive/hear the VA response on channel 2, code B (depending on predetermined radio mute/unmute settings to VA responses).

Accordingly, FIG. 2 and FIG. 3 provide configurations for communication system 100 of FIG. 1 to operate in a conventional repeater mode and a virtual assistant mode.

Figure 4:
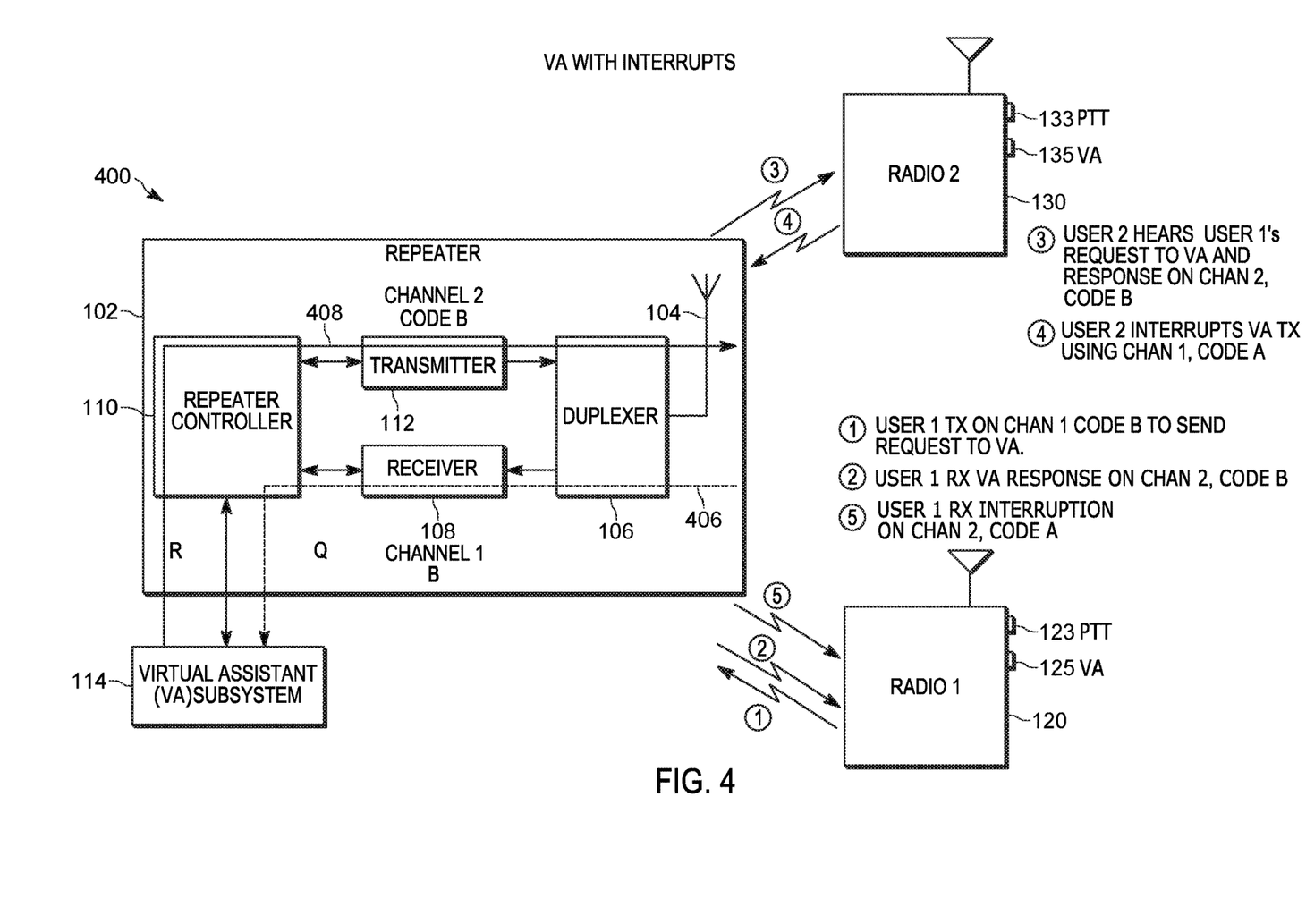
FIG. 4 is a signal routing diagram for interrupting the virtual assistant mode of operation for the communication system formed in accordance with the embodiments.

FIG. 4 is a signal routing diagram 400 for interruption of the virtual assistant mode of operation in the communication system 100 formed and operating in accordance with the embodiments. In this embodiment, the user of the first radio 120 initiates a VA query 406 to the virtual assistant (VA) subsystem 114 via a press of the VA button 125, followed by a press of the PTT button 123. The initiator radio 120 transmits on channel 1, code B to send the VA query 406 to the VA subsystem 114. The VA response 408 is generated by VA subsystem 114 and routed to repeater controller 110 for transmission from the repeater transmitter 112 on channel 2, code B to the initiating radio 120, and the first, initiating radio 120 receives/hears the VA response using code B.

If the initiating radio 120 wishes to interrupt its own incoming VA response, then the PTT 123 is pressed to override the incoming VA response. In accordance with the embodiments, a press of PTT button 123 will interrupt the in-progress VA response. Radio 120 transmits code A upon PTT press to interrupt the VA response.

Interruption of the VA response 408 can also occur from the second, non-initiating radio 130 by pressing PTT 133 on channel 1, code A. The VA response 408 being received by the initiating radio 120 is then interrupted on channel 2, code A with voice communication from the second radio 130. As an example to the second approach to VA interruption, a user of a second, non-initiating radio 130 may receive/hear the query of first, initiating radio 120 and the on-going subsequent response. The user of second, non-initiating radio 130 may experience an urgent event, such as an injury, shooting or other urgent to mission critical matter. The user of second, non-initiating radio 130 can advantageously interrupt the VA response to the first, initiating radio 120 by a pressing of the PTT 133 on the busy channel.

Even if the second non-initiating radio 130 is not in receiving/hearing the query or the response of first, initiating radio 120, the non-initiating radio 130 is still able to override communication taking place from repeater 102 to initiating radio 120 as long as the override communication is regular normal voice traffic. Thus, normal mode communication takes priority of VA communication regardless of whether the non-initiating radio is aware of the VA communication taking place between the repeater 102 and the initiating radio 120. Additionally, in some embodiments, a quick key override (QKO) configuration may be used to intentionally generate interference to let a high priority user through.

In a third approach to VA interruption, the VA subsystem 114 may receive a second VA query from another radio on the first channel, with the same code while responding to the first query on the second channel. In accordance with some embodiments, no interruption to the VA response 408 is made in this case. The VA subsystem 114 queues the new request for response after the current VA response 408 is completed. Alternatively, in some embodiments, it may be preferable to configure the repeater 102 to inhibit the outbound VA query during a VA response.

During regular repeater operation, as was shown in FIG. 2, the repeater transmitter 112 is active only when qualified channel activity is detected by the repeater receiver 108. In contrast, during a VA response 408, as shown in FIG. 4, the repeater receiver 108 is not receiving a signal while repeater transmitter 112 is transmitting the VA response 408. This allows repeater 102 to monitor for an interruption using repeater receiver 108. In both cases of code A interruption (self or other), the repeater controller 110 switches the audio stream (from a VA audio stream to a normal traffic audio stream) but does not remove the carrier channel.

In some embodiments, the VA subsystem 114 is notified of exactly when it loses the channel, thereby allowing the VA subsystem 114 to determine how best to resume and/or repeat a VA response at a later time. In some embodiments, repeater controller 110 may direct repeater transmitter 112 to change squelch codes, such as from code B to code A. Depending on the modulation scheme and the type of squelch code uses, it may be desirable to send a turn off code/reverse burst or equivalent to warn receivers that the transmission will end. This approach beneficially eliminates "squelch tail" type noise and facilitates re-acquisition of the new squelch code.

Resuming virtual assist mode after an interruption can be handled by a variety of predetermined approaches. In a first approach to resuming a VA response 408 after interruption, the VA subsystem 114 monitors the repeater status for predetermined "idle" time, referred to as hangtime. The repeater 102 can resume the VA response 408 after a predetermined hangtime. The VA response 408 may be retransmitted from the repeater 102 from the beginning or from a natural breakpoint in the response. Normally, the hangtime timer is used to de-key the repeater with the assumption that the voice communication is over. In the event that a VA response was interrupted, it serves as a time to determine when the VA response may resume. The repeater controller 110 again may just switch the audio stream (from a normal traffic audio stream to a VA audio stream) without removing the carrier channel.

In accordance with the interrupt embodiment, the VA subsystem 114 is aware of the exact point of the previous interruption. Playing the VA response from the beginning or from a midpoint may also depend on how long the interruption lasted. In some embodiments, an audible notification, such as audible numbering, tones, or some other audible alert may precede a resumed VA response to notify the user of the initiating radio 120 as to replay status. For example, a continuation of a previous response, as opposed to a new response, may be preceded by such a notification.

To summarize the interrupt mode of operation:
1—first user/initiating radio 120 transmits VA query on channel 1, code B to VA subsystem 114,
2—VA response is received from repeater 102 at initiating radio 120 on channel 2, code B,
3—second user/non-initiating radio 130 hears user 1's VA request and VA response on channel 2, code B,
4-second user/non-initiating radio 130 interrupts the VA transmission using channel 1, code A, and
5-first user/initiating radio 120 is interrupted and receives/hears the call of the second user on channel 2, code A.

The communication system 100 subjected to the interruption embodiments of FIG. 4 can further advantageously provide at least one of the following configurations: replay the entire VA response, play a remaining portion of a VA response, or elect a configuration based on interruption time.

Accordingly, FIG. 2, FIG. 3 and FIG. 4 provide configurations for communication system 100 of FIG. 1 to operate in a conventional repeater mode and a virtual assistant mode with interruption capability.

Figure 5:
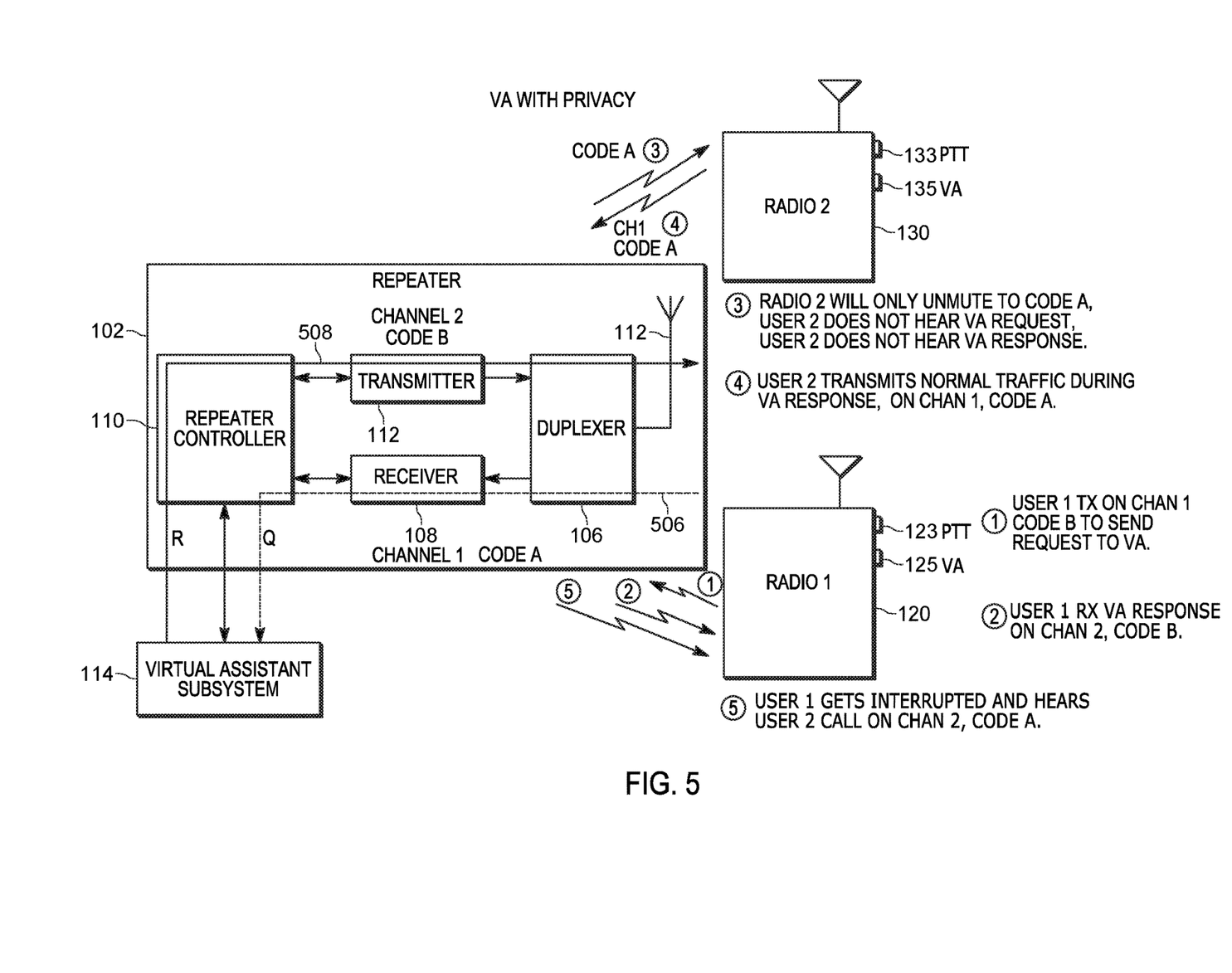
FIG. 5 is a signal routing diagram for enabling a privacy feature for the communication system formed in accordance with the embodiments.

FIG. 5 is a signal routing diagram 500 for virtual assistant mode of operation with an alternate privacy mode enabled for the communication system 100 formed in accordance with the embodiments. In this embodiment, the user of the first, initiating radio 120 submits a query 506 to the VA subsystem 114, by pressing the virtual assistant button 125 and transmitting on a first channel with the radio squelch code configured for a privacy setting (channel 1, code B). In this embodiment, code B has been pre-programmed for privacy mode. The VA response 508 is subsequently received by the initiating radio 120 on channel 2, code B, in the manner previously described. However, in accordance with the embodiments, the user of the second, non-initiating radio 130 receives/hears nothing pertaining to the VA query 506 or VA response 508 due to the privacy code setting. Thus, there are no interruptions to the non-initiating radio 130 from the VA initiating radio 120, while the non-initiating radio 130 is operating in the privacy mode. The user of the second, non-initiating radio 130 is however, still able to unmute to code A, and thereby able to hear other non-VA related communications.

Privacy may be configured in two locations:
1) at the repeater 102, where privacy is a configurable setting to determine if code B virtual assistant (VA) queries and responses are repeated or not; and
2) at the non-initiating radio 130, where privacy is configurable setting to determine if the radio will unmute to hear code B receptions.

Even if privacy is enabled at non-initiating radio 130, the non-initiating radio may transmit normal traffic on Channel 1, code A, during the VA response to the first radio 120 (which second user 130 does not receive/hear). The first, initiating radio 120 will hear the second radio's code A transmission because the repeater 102 will immediately drop the code B, VA response in favor of the code A voice traffic from the second radio 130. This advantageously allows normal traffic communication, which might be mission critical communications, occurring on code A to maintain priority and override VA communications.

To summarize an example of privacy mode of operation:
1-first user/initiating radio 120 transmits VA query on channel 1, code B to VA subsystem 114,
2-VA response is received from repeater 102 at initiating radio 120 on channel 2, code B,
3-neither VA request nor VA response are heard by second user/non-initiating radio 130, as the non-initiating radio 130 can only unmute to code A (regular traffic),
4-second user/non-initiating radio 130 may transmit normal traffic on channel 1, code A, during the VA response, and
5-first user/initiating radio 120 is interrupted and receives/hears the call of the second user on channel 2, code A.

The above sequence advantageously maintains priority of regular traffic communication over VA communications while providing flexibility for privacy options to listen to VA queries and responses. Accordingly, FIG. 2, FIG. 3, FIG. 4 and FIG. 5 provide configurations for communication system 100 of FIG. 1 to operate in a conventional repeater mode and a virtual assistant mode with interruption and privacy configurations.

The various embodiments of FIGS. 1-5 have provided for identification of human-to-VA and VA-to-human conventional voice traffic using squelch codes, achieved by having the repeater activate or deactivate the VA subsystem based on squelch code and the radio changing interruption rules based on the squelch code. The monitoring of the inbound channel for human-to-human voice traffic during an automated outbound VA response beneficially allows for immediate interruption of VA-to-human responses. The monitoring of the repeater inbound channel for human-to-VA request traffic during VA responses advantageously allows for pipelining of VA requests during VA response. The system allows for private or public VA interactions for radio users both at the repeater (repeated or not repeated) and/or at the radio.

Figure 6:
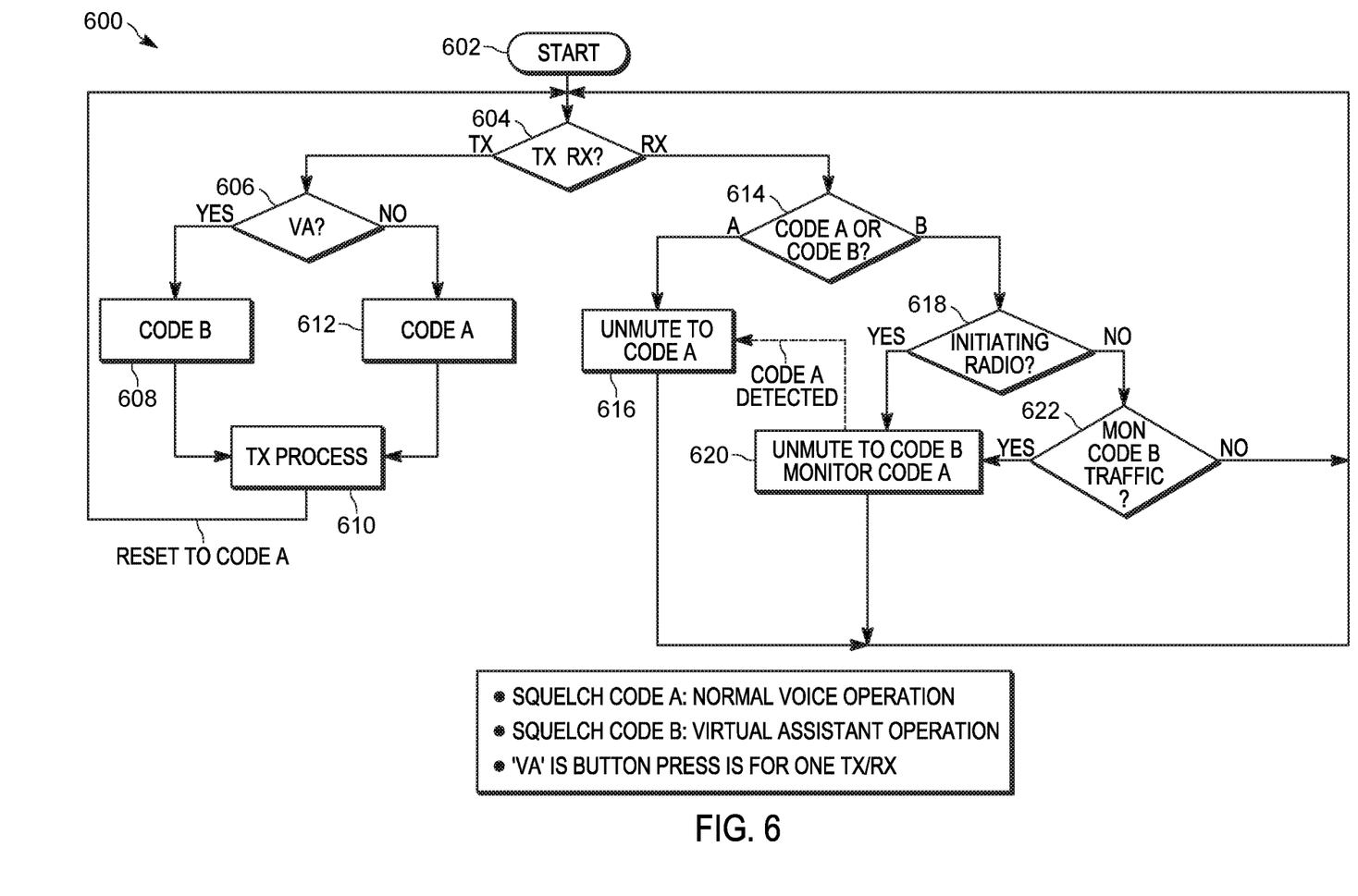
FIG. 6 is a method, viewed from a radio perspective, for handling communications in a communication system formed in accordance with the embodiments.
Figure 7:
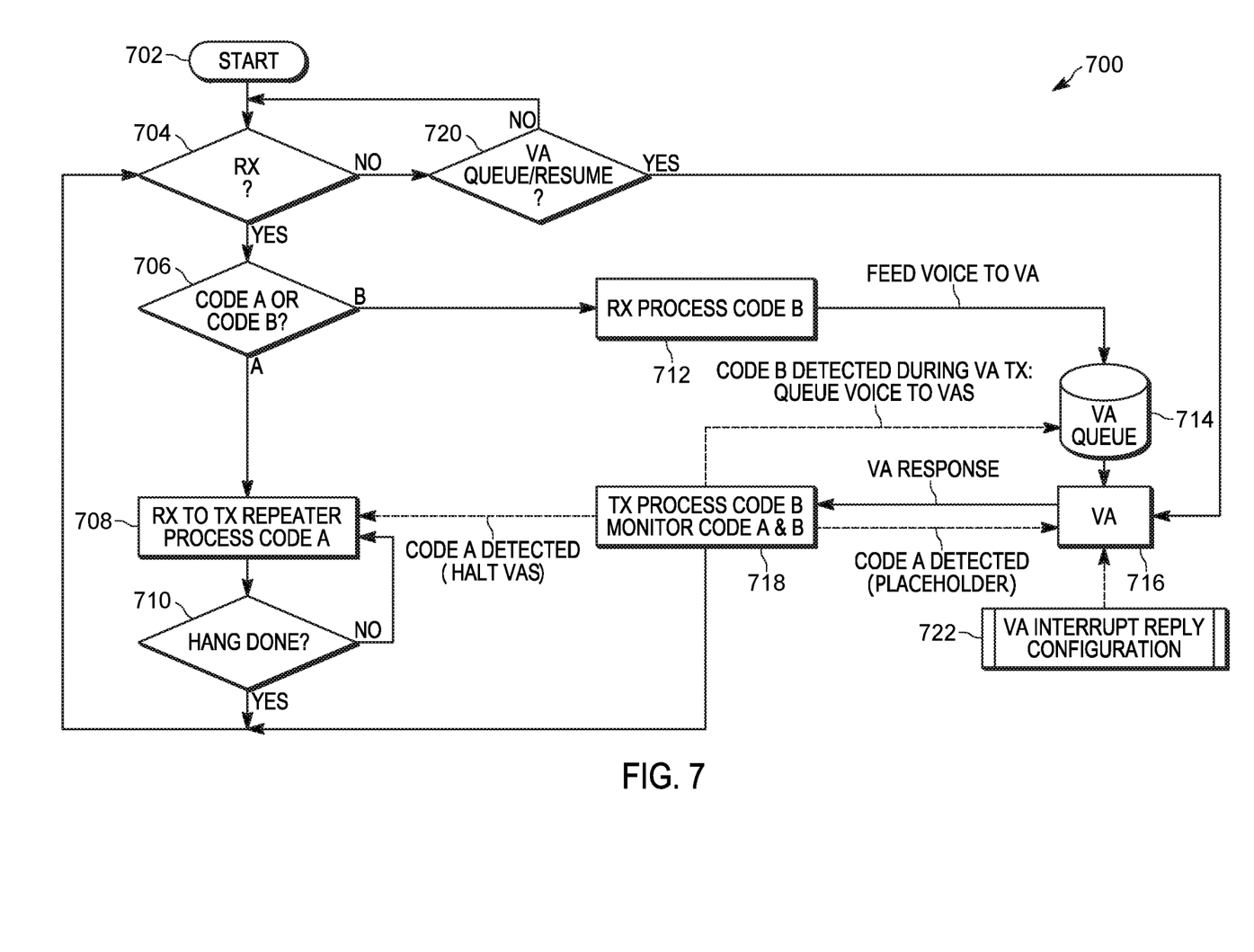
FIG. 7 is a method, viewed from a repeater perspective, for handling communications in a communication system formed in accordance with the embodiments.

FIGS. 6 and 7 provide flowcharts summarizing the operation of the communication system from the radio standpoint at method 600 and the repeater standpoint at method 700. The channel operation remains as previously described, so methods 600, 700 are described in terms of squelch codes to facilitate review.

FIG. 6 is a method 600 for operating a radio in accordance with some embodiments. Method 600 begins at 602 with squelch code A providing normal voice operation (default repeater mode of operation), and squelch code B providing virtual assistant operation.

At 604 the radio enters either a transmit mode or a receive mode. The transmit mode of operation will be determined in response to a PTT press at the radio. In response to determining a transmit mode of operation, the radio further determines whether a VA mode has been enabled at 606. Enabling of the VA mode is done by the user pressing the VA button on the radio, prior to pressing the radio's PTT button for transmit mode. When a determination is made that the VA mode has been enabled at 606, then the transmission of a VA query can be made by the user using squelch code B 608. The VA query is a spoken query, such as "weather inquiry", "license plate check" or any predetermined VA verbal policies that have been set by the organization. The radio transmits the VA query (to the repeater receiver and VA subsystem described previously) at 610. The radio squelch code is then reset to normal operation squelch code A, while the initiating radio awaits a response to the query.

When a determination is made that the VA mode has not been enabled at 606, then the normal voice operation takes place using squelch code A at 612. The normal audio operations are transmitted (to the repeater) at 610, and the method returns to 604 to monitor for further transmit and receive operations.

When the radio enters a receive mode at 604, the method determines which squelch code is being used at 614, such as squelch code A (normal operations) or squelch code B (VA operations). If squelch code A is determined at 614, then regular receive audio operations take place by unmuting to squelch code A at 616, and upon completion of communications, the radio returns to 604.

When squelch code B is determined at 614, then a check is made at 618 to determine if the radio was an initiating radio for the Code B reception or not. The initiating radio status can be verified by checking for the VA button press.

When a squelch code B, initiating radio reception is determined at 618, then the radio unmutes to Code B audio at 620 while monitoring for code A audio interruptions. If a code A audio interruption is detected during the unmuting of code B audio at 620, then the radio will unmute to Code A audio at 616, as code A audio will take priority. The method then returns to 604. If code A audio is not detected during the unmuting of code B audio at 620, then the processing of code B audio is completed at 620 and the method returns to 604. Thus, an initiating radio is able to hear a VA response to its VA query.

If a determination is made at 618 that squelch code B is being received on a non-initiating radio, then a check is made to determine if the non-initiating receiving radio is configured to monitor for code B traffic at 622.

If the non-initiating receiving radio is determined to be configured to listen to code B traffic at 622, then the code B audio is unmuted while monitoring for code A audio interruptions at 620. In other words, this path allows a non-initiating radio to listen to VA communications.

If non-initiating receiving radio is not configured to listen to code B traffic at 622, then the radio does not listen to the code B traffic, and returns to 604. In other words, in this path a non-initiating radio will not listen to the VA communications (privacy configuration)

FIG. 7 is a method 700 operating a repeater in accordance with some embodiments. Beginning at 702, the repeater receiver monitors for an incoming receive signal at 704. If the repeater receiver detects an incoming receive signal then the receiver repeater determines if the incoming signal is coming in on squelch code A or Squelch code B at step 70. When the received signal is on squelch code A, then the repeater receiver proceeds to perform repeater processes by re-transmitting the signal on code A, regular repeater mode operation at step 708. The signal is retransmitted until the inbound code A signal stops at which point the repeater enters a predetermined hangtime at 710 until the hangtime timer times out and the repeater goes back to monitoring for a receive signal at 704.

When an inbound repeater signal is received with code B at step 712, the inbound signal is considered to be a virtual assistant (VA) query, and the receiver processes the signal on code B and places the voice query in a VA queue at 714. The repeater's VA sub-system then process the VA query at 716 and generates a VA response. At step 718, the generated VA response is then transmitted as an outbound signal using code B, while the receiver monitors for incoming signals having code A and code B squelch codes associated therewith.

If, during the monitoring, a new code B virtual assistant (VA) query is detected at 718 during a VA transmission, then that new query is queued at 714. However, if a code A (normal voice transmission) is detected during monitoring at 718, then the VA is halted and normal voice transmission takes priority and is sent to the repeater transmitter for transmission on code A at 708 and such transmission continues until the inbound code A signal stops at which point the repeater enters hangtime at 710.

A virtual assistant (VA) interrupt replay configuration is further applied at 722 which enables VA responses to be replayed or continued once the interruption is completed. If no incoming receive signal is determined at 704, then the repeater receiver checks for queries that may be in queue in the VA subsystem, at 720. If no VA queries are in queue then the repeater receiver continues to monitor for an incoming receive signal at 704.

VA Queue 714 may have a pre-determined maximum length, which may include a maximum length one 1 (i.e. no queuing supported). In systems where queuing is not supported, the radios may be configured to disallow transmit on Code B (thus preventing a new VA query) while code B is being received (during a VA response).

Accordingly, the communication system and methods described by the various embodiments have provided for at least two modes of operation comprising a repeater mode of operation and a VA mode of operation. The method and apparatus beneficially provide VA operation, VA privacy, and VA interrupt on a single conventional channel. The incorporation of virtual assistant into a conventional repeater system has been advantageously achieved without the use of additional infrastructure or additional licensed channels. The transmit interrupt is achieved without the use of expensive digital repeaters or digital radios, thus the system avoids any use of digital TDMA repeaters.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A repeater, comprising:
  a repeater receiver;
  a repeater transmitter;
  a repeater controller coupled to the repeater receiver and the repeater transmitter as part of a radio communication system;
  a virtual assistant (VA) subsystem coupled to the repeater controller; and
  the repeater controller managing a normal repeater mode of operation and a virtual assistant (VA) mode of operation.

2. The repeater of claim 1, wherein the VA subsystem generates a VA response to a VA query received at the repeater receiver, and the repeater transmitter transmits the VA response.

3. The repeater of claim 1, wherein the normal repeater mode of operation takes priority over the VA mode of operation.

4. The repeater of claim 1, wherein the repeater controller manages the normal repeater mode of operation and the VA mode of operation based on predetermined squelch codes.

5. The repeater of claim 4, wherein the predetermined squelch codes further provide privacy and interrupt settings for controlling a retransmission of a VA query and VA response.

6. The repeater of claim 1, wherein the normal mode of operation is a conventional repeater mode of operation.

7. The repeater of claim 1, wherein radio communication system is a conventional radio communication system.

8. The repeater of claim 1, further comprising an antenna.

9. The repeater of claim 1, wherein the virtual assistant (VA) subsystem is formed of an artificial intelligence server providing language processing and response capability.

10. The repeater of claim 1, wherein the virtual assistant mode of operation operates using software applications that understand natural language and complete electronic tasks in response to user inputs.

11. A radio communication system, comprising:
  a plurality of radios;
  a repeater interoperating with the plurality of radios; and
  a virtual assistant (VA) subsystem interoperating with the repeater; and
  wherein the repeater selectively operates in a standard repeater mode of operation and virtual assistant (VA) mode of operation based on predetermined squelch codes received at the repeater.

12. The radio communication system of claim 11, wherein the communication system is a non-trunked system.

13. The radio communication system of claim 11, wherein the VA subsystem is communicatively coupled to the repeater over at least one of:
  a wired link; and
  a wireless link.

14. The radio communication system of claim 11, wherein the predetermined squelch codes comprise:
  a first squelch code for enabling normal communication;
  a second squelch code for enabling virtual assistant (VA) communication; and
  the first and second squelch codes further provide privacy and interruption settings, wherein:
  the privacy setting is a configurable setting, at the repeater, to determine whether VA queries and responses are repeated or not; and
  the privacy setting is a configurable setting, at a non-initiating radio, to determine if the non-initiating radio will unmute to hear VA responses.

15. The radio communication system of claim 11, wherein the repeater comprises:
  a repeater receiver for receiving a communication signal from one of the plurality of radios, the communication signal having a squelch code associated therewith; and
  a repeater controller for managing routing of the communication signal based on the squelch code, wherein a communication signal having a first squelch code indicative of normal communication is routed through to a repeater transmitter, and a communication signal having a second squelch indicative of a virtual assistant (VA) query is routed to the VA subsystem for generation of a VA response and transmission of the VA response from the repeater transmitter.

16. The radio communication system of claim 15, wherein the repeater controller provides an interrupt signal to the VA subsystem to indicate when an interruption to the VA response has occurred.

17. The radio communication system of claim 15, wherein the repeater controller is configured to perform at least one of:
  replay an entire virtual assistant (VA) response when an interruption has occurred; and
  play a remaining portion of a VA response when an interruption has occurred.

18. The radio communication system of claim 15, wherein in normal repeater mode of operation the repeater receiver receives on a first channel with a first squelch code and the repeater transmitter transmits on a second channel with the first squelch code thereby transmitting and receiving on opposite channels, and in the VA mode of operation the repeater receiver receives on the first channel with a second squelch code and the repeater transmitter transmits on a second channel with the second squelch code.

19. The radio communication system of claim 11, wherein the repeater is a conventional repeater.

20. The radio communication system of claim 11, wherein the standard repeater mode of operation is a conventional repeater mode of operation.

21. The radio communication system of claim 11, wherein the virtual assistant (VA) subsystem is formed of an artificial intelligence server providing language processing and response capability.

22. The radio communication system of claim 11, wherein the virtual assistant mode of operation operates using software applications that understand natural language and complete electronic tasks in response to user inputs.

* * * * *